US009471365B2

(12) United States Patent
Tian et al.

(10) Patent No.: US 9,471,365 B2
(45) Date of Patent: *Oct. 18, 2016

(54) TECHNIQUES FOR PERFORMING VIRTUAL MACHINE SOFTWARE UPGRADES USING VIRTUAL DISK SWAPPING

(71) Applicant: VMware, Inc., Palo Alto, CA (US)

(72) Inventors: Feng Tian, Fremont, CA (US); Jin Zhang, Sunnyvale, CA (US); Jiajun Wang, Shanghai (CN); Zhao Jin, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,261

(22) Filed: Jul. 7, 2015

(65) Prior Publication Data

US 2015/0339149 A1 Nov. 26, 2015

Related U.S. Application Data

(63) Continuation of application No. 13/741,047, filed on Jan. 14, 2013, now Pat. No. 9,110,757.

(51) Int. Cl.
  *G06F 9/44* (2006.01)
  *G06F 9/455* (2006.01)
  *G06F 9/445* (2006.01)
  *G06F 3/06* (2006.01)

(52) U.S. Cl.
  CPC ........... *G06F 9/45558* (2013.01); *G06F 3/065* (2013.01); *G06F 3/0619* (2013.01); *G06F 3/0665* (2013.01); *G06F 3/0689* (2013.01); *G06F 8/63* (2013.01); *G06F 8/65* (2013.01); *G06F 2009/45562* (2013.01)

(58) Field of Classification Search
  CPC ........ G06F 8/65; G06F 8/63; G06F 9/45533; G06F 9/45558; G06F 9/5077; G06F 3/0617; G06F 3/1415; G06F 17/30067; G06F 11/3664; G06F 2009/45562; H04L 41/0843
  See application file for complete search history.

(56) References Cited

U.S. PATENT DOCUMENTS

| | | | | |
|---|---|---|---|---|
| 6,961,941 | B1* | 11/2005 | Nelson | G06F 9/45533 719/310 |
| 7,356,679 | B1* | 4/2008 | Le | G06F 17/30067 707/E17.01 |
| 8,286,174 | B1* | 10/2012 | Schmidt | G06F 9/5077 709/226 |
| 2007/0198656 | A1* | 8/2007 | Mazzaferri | G06F 3/1415 709/218 |
| 2008/0244577 | A1* | 10/2008 | Le | G06F 8/63 718/1 |
| 2009/0037680 | A1* | 2/2009 | Colbert | G06F 3/0617 711/162 |
| 2010/0070978 | A1* | 3/2010 | Chawla | G06F 9/5077 718/105 |
| 2011/0022694 | A1* | 1/2011 | Dalal | H04L 41/0843 709/222 |

(Continued)

*Primary Examiner* — Tuan Vu (57) ABSTRACT

In one embodiment, a computer system creates a first template VM that includes a first OS VMDK and a first software binary VMDK, and clones the first template VM to create a linked clone VM. The linked clone VM executes a guest OS by accessing the first OS VMDK and a software application by accessing the first software binary VMDK. The computer system further creates a second template VM that includes a second software binary VMDK, where the second software binary VMDK includes one or more upgrades to the software application that are not included in the first software binary VMDK. The computer system then detaches the first software binary VMDK from the linked clone VM and attaches the second software binary VMDK to the linked clone VM. The linked clone VM thereafter executes the software application by accessing the second software binary VMDK.

18 Claims, 8 Drawing Sheets

(56) References Cited

U.S. PATENT DOCUMENTS

| | | | |
|---|---|---|---|
| 2011/0083122 A1* | 4/2011 | Chen | G06F 11/3664 717/124 |
| 2011/0185292 A1* | 7/2011 | Chawla | G06F 9/5077 715/760 |
| 2012/0144391 A1* | 6/2012 | Ueda | G06F 9/45558 718/1 |
| 2012/0174096 A1* | 7/2012 | Conover | G06F 9/45558 718/1 |
| 2012/0246642 A1* | 9/2012 | Pafumi | G06F 8/63 718/1 |
| 2014/0201725 A1 | 7/2014 | Tian et al. | |

\* cited by examiner

TECHNIQUES FOR PERFORMING VIRTUAL MACHINE SOFTWARE UPGRADES USING VIRTUAL DISK SWAPPING

CROSS REFERENCE TO RELATED APPLICATION

This application is a continuation application and pursuant to 35 U.S.C. §120 is entitled to and claims the benefit of earlier filed application U.S. application Ser. No. 13/741,047, filed Jan. 14, 2013 (issued as U.S. Pat. No. 9,110,757 on Aug. 18, 2015), the content of which is incorporated herein by reference in its entirety for all purposes.

BACKGROUND

Software-as-a-Service, or "SaaS," is a software delivery model in which a service provider hosts a software application online (e.g., "in the cloud") for remote access by one or more users. Examples of software applications that are commonly offered via this model include databases, enterprise resource planning (ERP) applications, document/content management systems, and so on. A virtual infrastructure that supports SaaS includes a number of virtual machines (VMs) that are each configured to run an instance of the offered software application. One aspect of managing such a virtual infrastructure involves upgrading the software application in each VM on a periodic basis to, e.g., patch bugs or add new features.

In current implementations, this software upgrade process is typically handled by an update agent resident in each VM. The update agent communicates with a central update server and searches for updates (also referred to as "patches") that are applicable to the software application running in the VM. When the update agent finds a relevant patch on the central update server, the update agent downloads the patch and applies it within the VM.

While the foregoing approach works well for relatively small VM deployments, it can be problematic for large-scale VM deployments that are becoming increasingly common in virtual infrastructures that support SaaS. For instance, in a large-scale VM deployment, many VMs may attempt to download patches from the central update server concurrently. This significantly increases the network load on the central update server and can result in slow downloads, dropped connections, and other issues. Further, since the approach above requires each VM to download and apply a separate instance of a given patch, this approach can cause storage "bloat" due to multiple patch copies stored in backend storage, as well as host-side performance issues in scenarios where many VMs attempt to apply a resource-intensive patch at substantially the same time. Yet further, the application of a patch may fail for various reasons, such as a network or storage outage, configuration errors, etc. When a large number of VMs are in the process of applying a patch, it can be difficult to track the status of each VM in order to identify and address patch failures.

SUMMARY

Techniques for performing a VM software upgrade are provided. In one embodiment, a computer system creates a first template VM that includes a first operating system (OS) virtual disk (VMDK) and a first software binary VMDK, and clones the first template VM to create a linked clone VM. The linked clone VM executes a guest OS by accessing the first OS VMDK and a software application by accessing the first software binary VMDK. The computer system further creates a second template VM that includes a second software binary VMDK, where the second software binary VMDK includes one or more upgrades to the software application that are not included in the first software binary VMDK. The computer system then detaches the first software binary VMDK from the linked clone VM and attaches the second software binary VMDK to the linked clone VM. The linked clone VM thereafter executes the software application by accessing the second software binary VMDK.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments provide techniques for performing VM software upgrades using virtual disk (VMDK) swapping. In one embodiment, a server system (e.g., a central management server, or "CMS," in a virtual infrastructure) can create a template VM that includes an OS VMDK and a software binary VMDK. The OS VMDK can include an installation of a guest OS, and the software binary VMDK can include an installation of a software application. The server system can further provision one or more VMs based on the template VM, such that each provisioned VM is attached, or linked, to the OS VMDK and the software binary VMDK respectively. These attachments enable the provisioned VM to execute the guest OS from the OS VMDK and the software application from the software binary VMDK.

When one or more upgrades are made available for the software application, the server system can create a new template VM that includes a new software binary VMDK. The new software binary VMDK can include an installation of the software application that has been patched/updated with the one or more upgrades. The server system can then swap, for each VM provisioned from the original template VM, the original software binary VMDK with the new software binary VMDK. In one embodiment, this can comprise detaching the original software binary VMDK from the provisioned VM and attaching the new software binary VMDK to the provisioned VM. At the conclusion of this swapping process, each provisioned VM can execute the upgraded version of the software application from the new software binary VMDK (rather than executing the original version of the software application from the original software binary VMDK), thereby resulting in an effective upgrade of the VM with respect to the software application. In certain embodiments, the server system can use a similar VMDK swapping approach to upgrade the guest OS of each provisioned VM.

Figure 1:
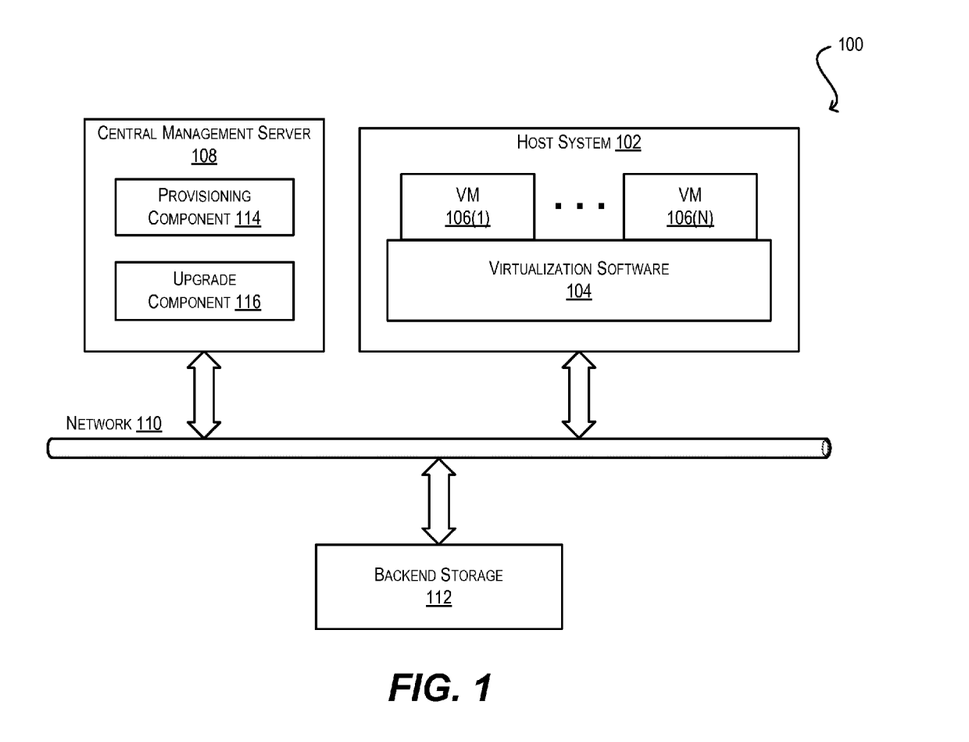
FIG. 1 depicts a block diagram of a virtual infrastructure that supports VM software upgrades via VMDK swapping according to one embodiment.

FIG. 1 depicts a virtual infrastructure 100 that supports VM software upgrades via VMDK swapping according to an embodiment. As shown, virtual infrastructure 100 includes a host system 102 that executes virtualization software 104. Virtualization software 104 (also known as a "hypervisor") is a software layer that provides an environment in which one or more deployed VMs 106(1)-106(N) can run. In one embodiment, virtualization software 104 can interact directly with the hardware platform of host system 102 without an intervening host operating system. In this embodiment, virtualization software 104 can include a kernel (not shown) that manages VM use of the various hardware devices of host system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

Virtual infrastructure 100 also includes a central management server (CMS) 108 that communicates with host system 102 via a network 110. CMS 108 can perform various management tasks with respect host system 102 and VMs 106(1)-106(N), such as VM lifecycle management, hardware monitoring, load balancing, and so on. Although only a single host system is shown in FIG. 1, it should be appreciated that CMS 108 can simultaneously manage a large number of host systems (each comprising multiple VMs), such as all of the host systems in a virtual infrastructure cluster.

Each VM 106(1)-106(N) running on host system 102 can execute a guest OS and one or more software applications (e.g., databases, business applications, etc.). In one embodiment, the one or more software applications can correspond to one or more software services that the owner/administrator of virtual infrastructure 100 offers to remote users (e.g., customers). The software code (e.g., binaries, configuration files, etc.) for the guest OS and the one or more software applications can be maintained in virtual disks, or "VMDKs," that are stored in a backend storage device, such as backend storage 112.

As noted in the Background section, one aspect of managing a virtual infrastructure such as virtual infrastructure 100 of FIG. 1 involves periodically upgrading the software executed by VMs 106(1)-106(N). Performing this upgrade process on a regular basis is particularly important in a SaaS scenario, since it is desirable to provide the latest and most stable/bug-free software to customers. Prior art implementations carry out VM software upgrades by downloading and applying patches on a per VM basis via a VM-specific update agent. However, this approach is problematic for a number of reasons (e.g., increased network load, increased CPU/memory load on host systems during the patch application process, storage bloat on backend storage devices, difficulty in tracking patch statuses across VMs, etc.).

To address the foregoing and other similar issues, CMS 108 can include a provisioning component 114 and an upgrade component 116. At a high level, provisioning component 114 can provision VMs 106(1)-106(N) based on a template VM that incorporates an initial installation of a software application (via a software binary VMDK). When an upgrade for the software application becomes available, provisioning component 114 can generate a new template VM that includes an upgraded installation of the software application (via a new software binary VMDK). Upgrade component 116 can then swap, for each VM 106(1)-106(N), the existing software binary VMDK with the new software binary VMDK. This swapping process enables VMs 106(1)-106(N) to access and execute the upgraded version of the software application, without requiring each VM to independently download and apply any patches.

Figure 2A:
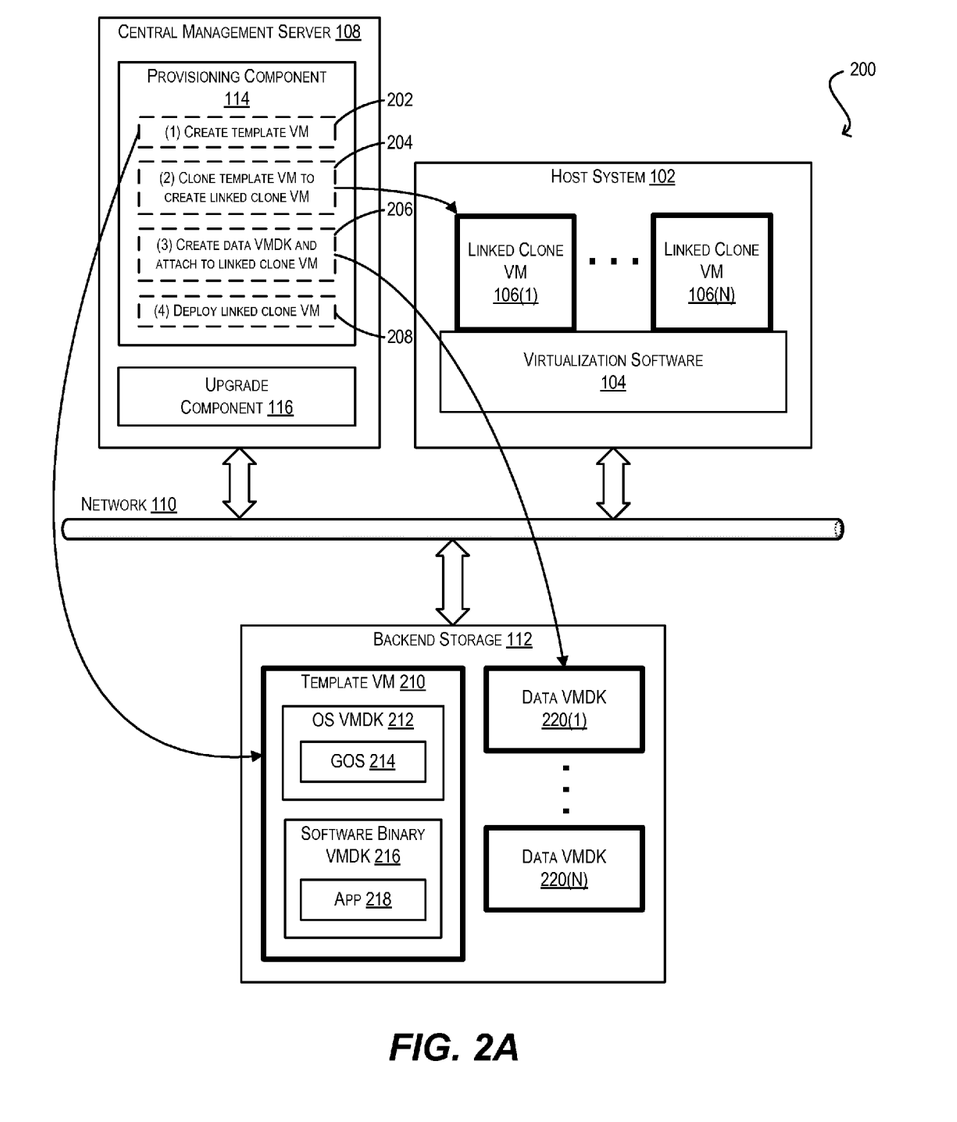
FIG. 2A depicts a flow within the virtual infrastructure of FIG. 1 for provisioning one or more VMs according to one embodiment.

FIG. 2A depicts a flow 200 that can be performed by provisioning component 114 of CMS 108 for provisioning VMs 106(1)-106(N) according to an embodiment. At step (1) of flow 200 (reference numeral 202), provisioning component 114 can create a template VM 210. As used herein, a "template VM" is different from a typical VM in that a template VM is not associated with the hardware resources of any particular host system (and thus cannot be directly executed). Instead, a template VM defines a common set of software installations (via one or more VMDKs) and other associated configuration information that CMS 108 can use as a template to provision actual VMs. For example, template VM 210 comprises an OS VMDK 212 that includes an installation of a guest OS (GOS 214) and a software binary VMDK 216 that includes an installation of a software application (app 218). In certain embodiments, template VM 210 can also include configuration information for a third VMDK (e.g., a data VMDK) that CMS 108 can attach to VMs that are provisioned from template VM 210 (described below).

In the embodiment FIG. 2A, template VM 210 is shown as being created directly in backend storage 112. In alternative embodiments, CMS 108 can create template VM 210 at another location and then copy template VM 210 to backend storage 112.

At step (2) (reference numeral 204), provisioning component 114 can clone template VM 210 to create a linked clone VM 106(1). Linked clone VM 106(1) can share substantially the same configuration as template VM 210, but is deployable (i.e., can be executed). Further, linked clone VM 106(1) can be attached, or linked, to OS VMDK 212 and software binary VMDK 216 of template VM 210. These attachments allow linked clone VM 106(1) to execute guest OS 214 installed on OS VMDK 212 and software application 218 installed on software binary VMDK 216.

At step (3) (reference numeral 206), provisioning component 114 can create a data VMDK 220(1) in backend storage 112 that is specific to linked clone VM 106(1). Provisioning component 114 can then attach data VMDK 220(1) to linked clone VM 106(1). This attachment process can comprise defining a logical link (in the form of, e.g., configuration metadata) that enables linked clone VM 106(1) to access data VMDK 220(1). In certain embodiments, data VMDK 220(1) does not include any pre-installed software or data. Instead, linked clone VM 106(1) can use data VMDK 220(1) to store user data and other VM-specific information that linked clone VM 106(1) generates as part of its runtime operation.

Finally, at step (4) (reference numeral 208), CMS 108 can deploy linked clone VM 106(1) on host system 102 and initiate execution of the VM. CMS 108 can then repeat steps (2)-(4) of flow 200 to provision additional linked clone VMs based on template VM 210 (e.g., linked clone VMs 106(2)-106(N)).

Figure 2B:
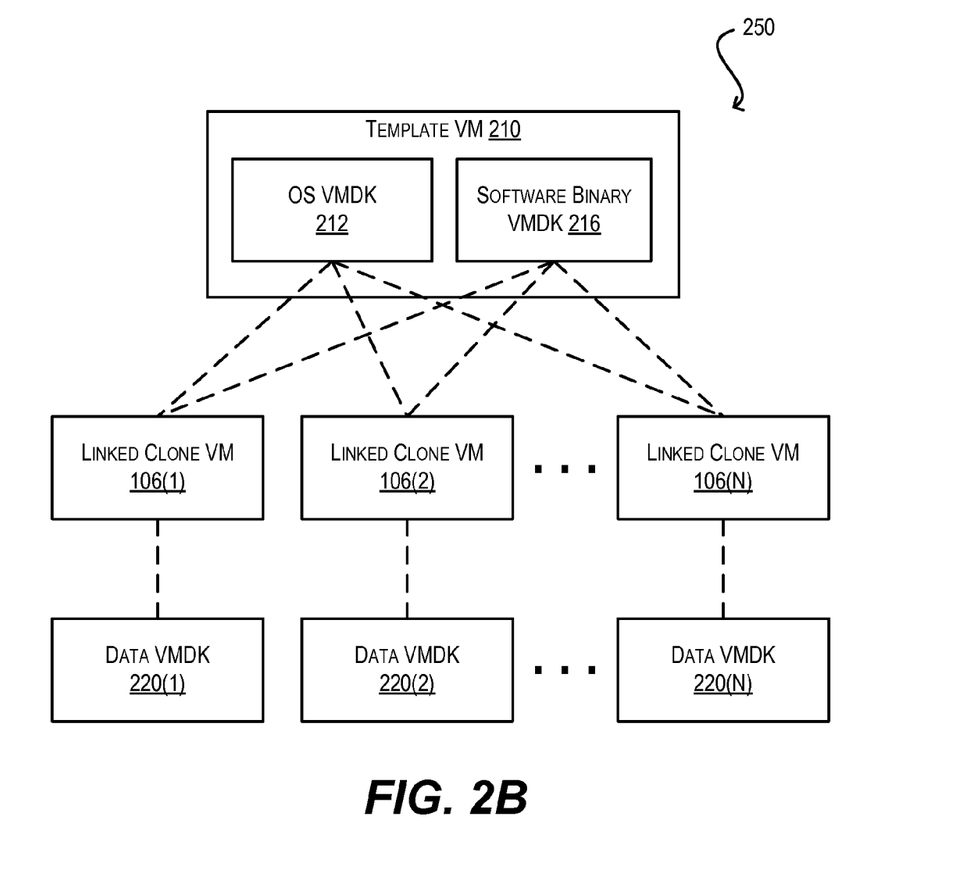
FIG. 2B depicts a block diagram illustrating links between the VMs provisioned in FIG. 2A and one or more VMDKs according to one embodiment.

FIG. 2B depicts a diagram 250 that illustrates exemplary attachments between linked clone VMs 106(1)-106(N), OS VMDK 212, software binary VMDK 216, and data VMDKs 220(1)-220(N) at the conclusion of the provisioning process of FIG. 2A. Each attachment (represented by a slashed line) is a logical link that enables a particular linked clone VM to access the attached VMDK. As shown in FIG. 2B, each linked clone VM 106(1)-106(N) is attached to OS VMDK 212 and software binary VMDK 216 of template VM 210, and thus is configured to access and execute the same installation of guest OS 214 and the same installation of software application 218. Further, each linked clone VM 106(1)-106(N) is attached to its own data VMDK 220(1)-220(N) for storing user/VM-specific data.

Figure 3A:
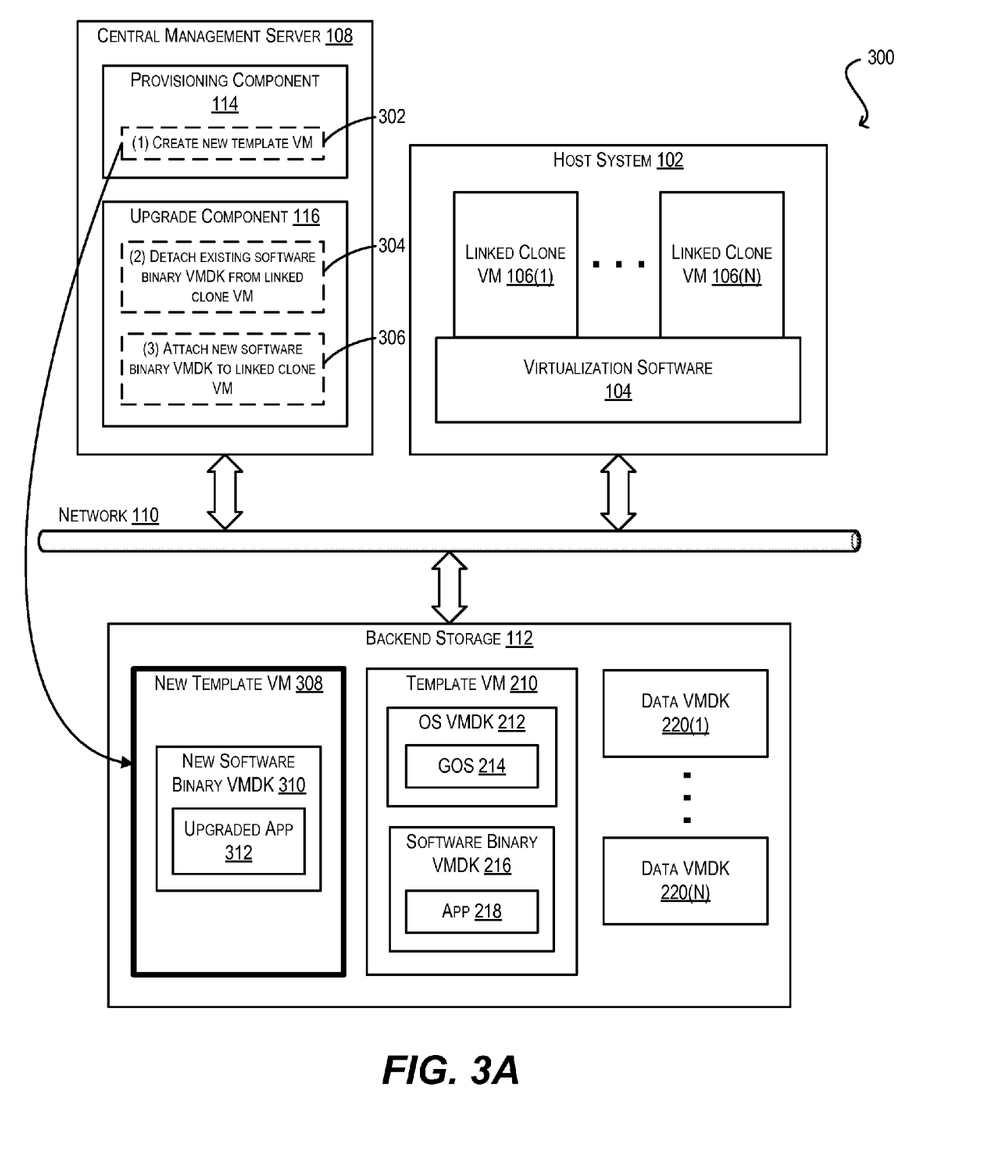
FIG. 3A depicts a flow for upgrading the VMs provisioned in FIG. 2A according to one embodiment.

FIG. 3A depicts a flow 300 that can be performed by provisioning component 114 and upgrade component 116 for upgrading linked clone VMs 106(1)-106(N) subsequent to flow 200 of FIG. 2A according to an embodiment. In various embodiments, CMS 108 can initiate flow 300 once one or more software upgrades are available for software application 218.

At step (1) of flow 300 (reference numeral 302), provisioning component 114 can create a new template VM 308 that includes a new software binary VMDK 310. As part of creating new template VM 308/new software binary VMDK 310, provisioning component 114 can install, on new software binary VMDK 310, an upgraded version of software application 218 (i.e., upgraded app 312) that is newer than (or different from) the version installed on software binary VMDK 216 of template VM 210. In one embodiment, provisioning component 114 can perform this step by installing the upgraded version on new software binary VMDK 310 from scratch (i.e., performing a clean install). In another embodiment, provisioning component 114 can perform this step by installing a previous version of software application 218 onto new software binary VMDK 310 and then applying one or more patches.

Once provisioning component 114 has created new template VM 308/new software binary VMDK 310, upgrade component 116 of CMS 108 can upgrade each linked clone VM 106(1)-106(N) via a VMDK swapping process. For example, at step (2) (reference numeral 304), upgrade component 116 can detach software binary VMDK 216 from linked clone VM 106(1). In one embodiment, this detachment process can comprise deleting the logical link that enables linked clone VM 106(1) to access software binary VMDK 216. Upgrade component 116 can then attach new software binary VMDK 310 to linked clone VM 106(1) in the place of software binary VMDK 216 (step (3), reference numeral 306). This attachment process can comprise creating a new logical link that enables VM 106(1) to access new software binary VMDK 310.

Upgrade component 116 can subsequently repeat steps (2) and (3) for the remaining linked clone VMs (e.g., 106(2)-106(N)) such that their attached VMDKs are swapped in the same way. At the conclusion of flow 300, each linked clone VM 106(1)-106(N) can be attached to new software binary VMDK 310 of new template VM 308 (rather than software binary VMDK 216 of template VM 210), and can access/execute upgraded version 312 of software application 218 (rather than the previous version installed on software binary VMDK 216). Thus, each linked clone VM 106(1)-106(N) can be considered "upgraded" with respect to software application 218.

Figure 3B:
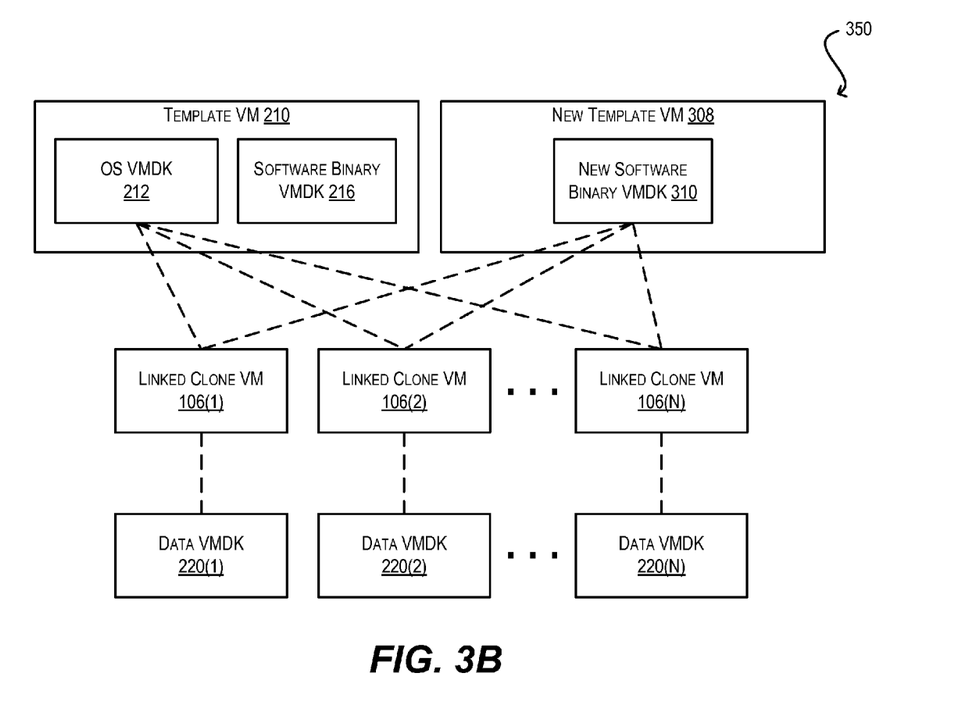
FIG. 3B depicts a block diagram illustrating links between the VMs upgraded in FIG. 3A and one or more VMDKs according to one embodiment.

FIG. 3B depicts an diagram 350 that illustrates exemplary attachments between linked clone VMs 106(1)-106(N), OS VMDK 212, software binary VMDK 216, new software binary VMDK 310, and data VMDKs 220(1)-220(N) after linked clone VMs 106(1)-106(N) have been upgraded per FIG. 3A. As shown, each linked clone VM 106(1)-106(N) is now attached to new software binary VMDK 310 of new template VM 308; the previous links to software binary VMDK 216 of template VM 210 no longer exist. Further, each linked clone VM 106(1)-106(N) remains attached to its respective data VMDK 220(1)-220(N). This allows the user or VM-specific data stored in data VMDKs 220(1)-220(N) to persist across the application upgrade.

Taken together, the provisioning and upgrade flows of FIGS. 2A and 3A provide a number of advantages over prior art upgrade techniques that require patch downloading/installation on a per VM basis. For example, in flow 300 of FIG. 3A, the installation of a particular software upgrade for software application 218 only happens once (i.e., at the time of creating new template VM 310/new software binary VMDK 310), and is only performed by a single entity (i.e., CMS 108). This increases the reliability of the upgrade process, since CMS 108 can easily identify and address any problems that may occur during installation of the upgrade. Further, this eliminates the need to apply patches or install software within each VM at host system 102, which can be beneficial if host system 102 does not have sufficient CPU and/or memory resources to handle the load of multiple, potentially concurrent, patch runs.

Further, since linked clone VMs 106(1)-106(N) all access the same software application installation, there is no need to download and store separate copies of a given patch to backend storage 112. This saves network bandwidth and storage space. Yet further, since CMS 108 orchestrates the VMDK swapping process for each linked clone VM 106(1)-106(N) (via upgrade component 116), CMS 108 can easily track the status of each VM to determine whether any errors have occurred.

It should be appreciated that flows 200 and 300 of FIGS. 2A and 3A are illustrative and many variations, modifications, and alternatives are possible. For example, in certain embodiments, flow 300 can be modified to upgrade guest OS 214 for each linked clone VM 106(1)-106(N) (in addition to, or in lieu of, upgrading software application 218). In these embodiments, CMS 108 can create a new OS VMDK that is part of new template VMDK 308 and that includes an upgraded version of guest OS 214. CMS 108 can then swap, for each linked clone VM 106(1)-106(N), OS VMDK 212 with the new OS VMDK in a manner similar to the swapping described with respect to software binary VMDK 216 and new software binary VMDK 310. Once this swapping is complete, each linked clone VM 106(1)-106(N) can access and execute the upgraded version of the guest OS from the new OS VMDK.

As another example, in some embodiments, upgrade component 116 can instruct each linked clone VM 106(1)-106(N) to perform one or more pre-upgrade actions prior to detaching software binary VMDK 212 from the VM at step (2) of flow 300, and/or one or more post-upgrade actions after attaching new software binary VMDK 314 to the VM at step (3) of flow 300. Examples of such pre-upgrade and post-upgrade actions are described with respect to FIG. 5 below.

Figure 4:
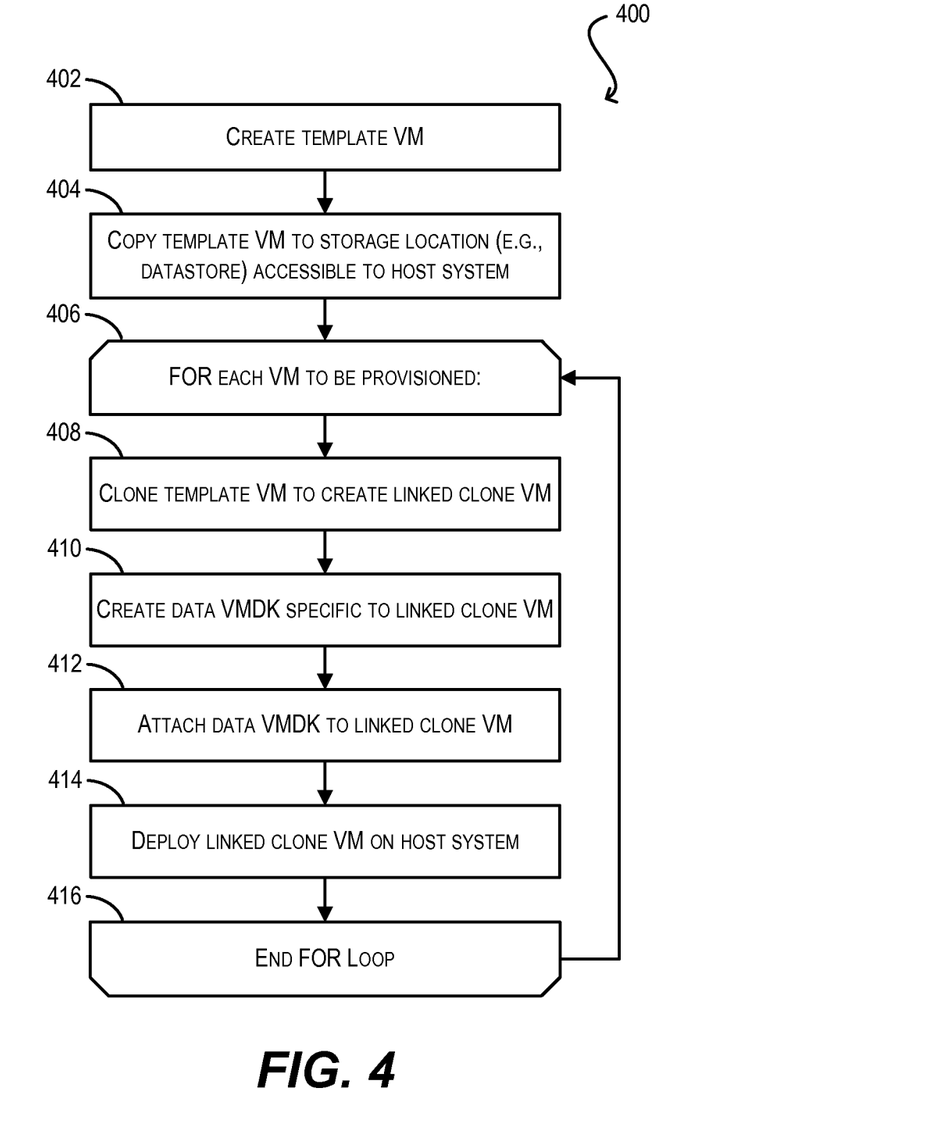
FIG. 4 depicts a flowchart that provides additional details regarding the provisioning flow of FIG. 2A according to one embodiment.

FIG. 4 depicts a flowchart 400 that can be performed by provisioning component 114 of CMS 108 for provisioning VMs according to one embodiment. Flowchart 400 provides a more detailed description of the steps attributed to provisioning component 114 in flow 200 of FIG. 2A.

At block 402, provisioning component 114 can create a template VM (e.g., template VM 208) that includes an OS VMDK (e.g., OS VMDK 212) and a software binary VMDK (e.g., software binary VMDK 216). As explained with respect to FIG. 2A, the template VM can represent a base VM definition that CMS 108 can use as a template to provision multiple VMs that share similar properties. In one embodiment, the OS VMDK can include an installation of a guest OS (e.g., GOS 214) and the software binary VMDK can include an installation of a software application (e.g., application 218). As part of block 402, provisioning component 114 can store the template VM in a storage device accessible to CMS 108.

At block 404, provisioning component 114 can copy the template VM to a storage location (e.g., backend storage 112) accessible to one or more host systems (e.g., host system 102). This step can include copying the template VM to one or more datastores mounted by the host system(s). In cases where provisioning component 114 has created the template VM directly in such a datastore, this step can be omitted.

Once provisioning component 114 has copied the template VM to a host-accessible location, provisioning component 114 can enter a loop for each VM to be provisioned (block 406). Within this loop, provisioning component 114 can first clone the template VM to create a linked clone VM (e.g., linked clone VM 106(1)) (block 408). In various embodiments, the linked clone VM can be attached, or linked, to the OS and software binary VMDKs of the template VM respectively, and can be configured to execute the guest OS installed on the OS VMDK and the software application installed on the application binary VMDK.

At block 410, provisioning component 114 can create a data VMDK (e.g., data VMDK 220(1)) that is specific to the linked clone VM created at block 408. Provisioning component 114 can then attach the data VMDK to the linked clone VM (block 412). The linked clone VM can use the data VMDK to store user data and other VM-specific information that is not part of the guest OS installation on the OS VMDK or the software application installation on the software binary VMDK.

At block 414, provisioning component 114 can deploy the linked clone VM on a particular host system (e.g., host system 102), thereby causing the linked clone VM to begin execution. As noted above, at runtime, the linked clone VM can run the guest OS installed on the OS VMDK of the template VM and the software application installed on the software binary VMDK of the template VM. Finally, at block 416, provisioning component 115 can reach the end of the current loop iteration can return to block 406 to provision additional linked clone VMs based on the template VM (e.g., linked clone VMs 106(2)-106(N)).

Figure 5:
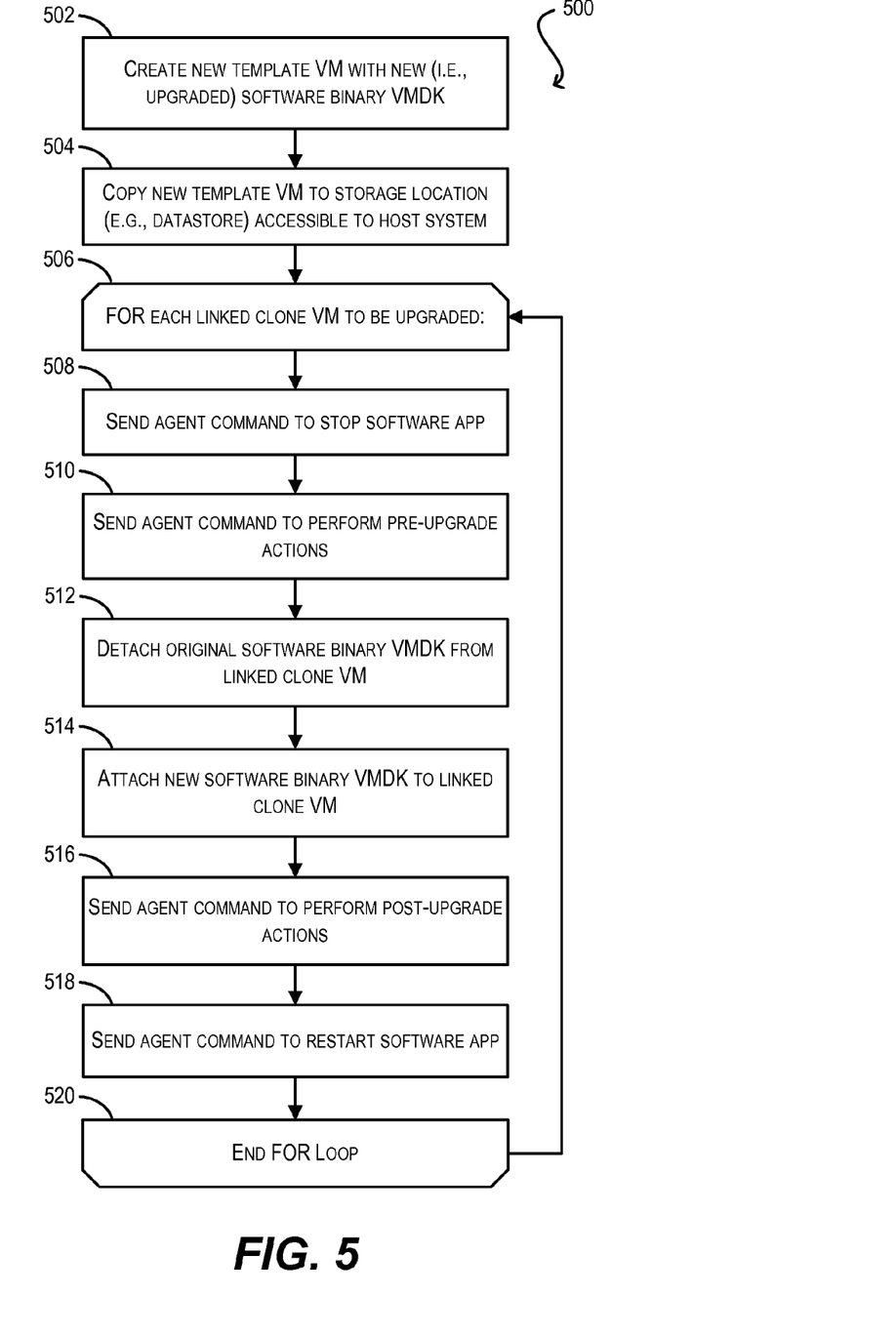
FIG. 5 depicts a flowchart that provides additional details regarding the upgrade flow of FIG. 3A according to one embodiment.

FIG. 5 depicts a flowchart 500 that can be performed by provisioning component 114 and upgrade component 116 of CMS 108 for upgrading VMs according to one embodiment. Flowchart 500 provides a more detailed description of the steps attributed to components 114 and 116 in flow 300 of FIG. 3A.

At block 502, provisioning component 114 can create a new template VM (e.g., new template VM 308) that is distinct from the original template VM created at block 402. The new template VM can include a new software binary VMDK (e.g., new software binary VMDK 310) that includes an upgraded version of the software application installed on the original software binary VMDK of the original template VM. In order to create the new software binary VMDK, provisioning component 114 can perform a fresh install of the latest (i.e., upgraded) version of the software application. Alternatively, provisioning component 114 can copy a previous installation of the software application (from, e.g. the original software binary VMDK) to the new software binary VMDK, and then apply one or more patches to upgrade the previous installation.

At block 504, provisioning component 114 can copy the new template VM to the same host-accessible storage location that the original template VM was copied to at block 404 of FIG. 4. In cases where provisioning component 114 has created the new template VM directly in such a location, this step can be omitted.

The remaining blocks of FIG. 5 describe the upgrade orchestration process performed by upgrade component 116. At block 506, upgrade component 116 can initiate a loop for each linked clone VM provisioned via process 400 of FIG. 4. Within this loop, upgrade component 116 can first send a command to an agent running within the current linked clone VM to stop execution of the software application installed on the original software binary VMDK (block 508). In various embodiments, this agent can reside in all of the linked clone VMs deployed from the original template VM. In a particular embodiment, provisioning component 114 can pre-install the agent on the original OS VMDK of the original template VM.

At block 510, upgrade component 116 can send a command to the agent to perform one or more pre-upgrade actions. These pre-upgrade actions can include saving state information associated with the linked clone VM that the VM may have written to the original software binary VMDK during operation (e.g., configuration files, log files, etc.). In one embodiment, this state information can be stored in one or more delta disks of the original software binary VMDK, where the one or more delta disks correspond to additional VMDKs in backend storage 112 that maintain changes to the original software binary VMDK that are made by each linked clone VM. In this embodiment, the agent can retrieve the VM-specific state information from the one or more delta disks of the software binary VMDK and save the state information at a predefined location (e.g., directory) in the data VMDK attached to the linked clone VM.

At block 512, upgrade component 116 can detach the original software binary VMDK from the linked clone VM. This detachment process can comprise deleting the logical link maintained by CMS 108 (and/or host system 102) that enables the linked clone VM to access the original software binary VMDK. Upgrade component 116 can then attach the new software binary VMDK to the linked clone VM (step 514). This attachment process can comprise defining a new logical link that enables the linked clone VM to access the new software binary VMDK.

Once upgrade component 116 has swapped the original and new software binary VMDKs per block 512 and 514, upgrade component 116 can send a command to the agent to perform one or more post-upgrade actions (block 516). These post-upgrade actions can include actions that reverse the pre-upgrade actions performed at block 510. For example, in one embodiment, the post-upgrade actions can include retrieving VM-specific state information saved to the data VMDK and restoring the state information to appropriate locations on the new software binary VMDK. The post-upgrade actions can also include various other actions for finalizing the upgrade, such modifying aspects of the VM's configuration to be compatible with the upgraded version of the software application.

At block 518, upgrade component 116 can send a command to the agent to restart the software application. In response, the agent can invoke the executable for the upgraded software application from the new software binary VMDK (rather than the original software binary VMDK), thereby causing the linked clone VM to run the upgraded version of the application.

Finally, at block 520, upgrade component 116 can reach the end of the current loop iteration and can return to block 506 to upgrade additional linked clone VMs (e.g., linked clone VMs 106(2)-106(N)).

Figure 6:
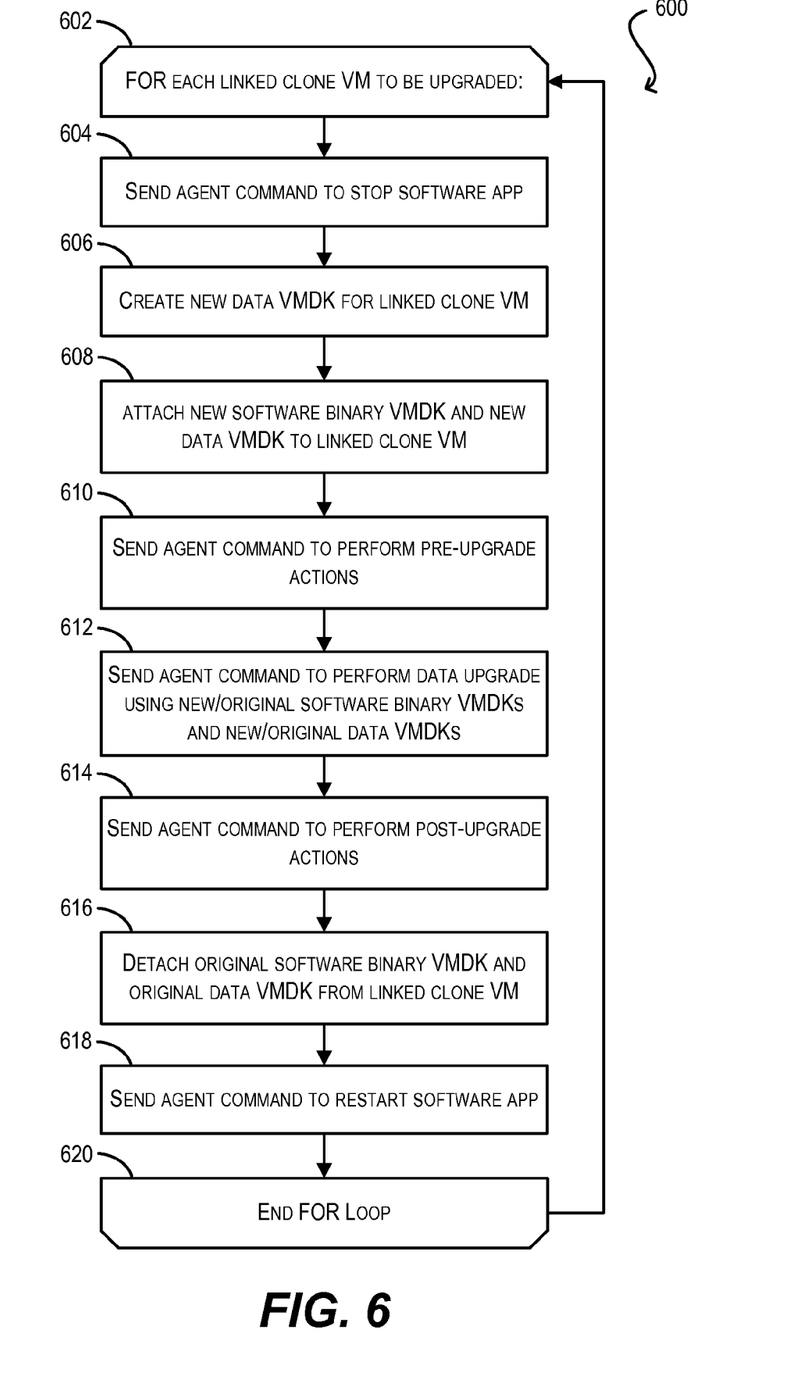
FIG. 6 depicts a flowchart that provides details regarding an alternative upgrade flow according to one embodiment.

In some cases, the upgrade of a software application may require an upgrade to user data that is used/created by the software application. For example, database-driven applications often require changes to the data in various database tables when new database tables are added (or the schema of existing database tables are modified) in a new application version. Further, in many of these scenarios, access to both the old and new versions of the application binaries is needed in order to carry out the data upgrade. To accommodate this, FIG. 6 depicts an alternative flowchart 600 that can be carried out by upgrade component 116 to orchestrate the upgrade of linked clone VMs 106(1)-106(N). In one embodiment, blocks 602-620 of FIG. 6 can replace blocks 506-520 of FIG. 5.

At block 602, upgrade component 116 can initiate a loop for each linked clone VM provisioned via process 400 of FIG. 4. Within this loop, upgrade component 116 can send a command to the agent running within the current linked clone VM to stop execution of the software application installed on the original software binary VMDK (block 604). Upgrade component 116 can then create a new data VMDK for the linked clone VM, and attach both the new data VMDK and the new software binary VMDK to the linked clone VM (blocks 606 and 608). Thus, at this point in the process, the linked clone VM is simultaneously attached to at least five VMDKs (the original OS VMDK, the original software binary VMDK, the original data VMDK, the new data VMDK, and the new software binary VMDK).

At block 610, upgrade component 116 can instruct the agent executing within the linked clone VM to perform one or more pre-upgrade actions. These pre-upgrade actions can be substantially similar to the actions discussed with respect to block 510 of FIG. 5. Once the pre-upgrade actions are complete, upgrade component 116 can instruct the agent to perform a data upgrade using the new/original software binary VMDKs and the new/original data VMDKs (block 612). In one embodiment, this step can comprises executing binaries accessible on the new and original software binary VMDKs that cause user data stored on the original data VMDK to be extracted, upgraded, and stored on the new data VMDK. At the end of the data upgrade process, the user data resident on the new data VMDK can be fully compatible with the upgraded version of the software application.

At block 614, upgrade component 116 can instruct the agent to perform one or more post-upgrade actions. These post-upgrade actions can be substantially similar to the actions discussed with respect to block 516 of FIG. 5. Upgrade component 116 can then detach the original software binary VMDK and the original data VMDK from the linked clone VM (block 616).

Finally, at blocks 618 and 620, upgrade component 116 can instruct the agent to restart the software application (from the new software binary VMDK) and can return to block 602 to upgrade additional linked clone VMs in the same manner.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including handheld devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Disc), CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Other arrangements, embodiments, implementations, and equivalents may be employed without departing from the scope hereof as defined by the claims.

What is claimed is:

1. A method for performing a virtual machine (VM) operating system (OS) upgrade, the method comprising:
    creating, by a central management server (CMS) in a virtual infrastructure, a first template VM in a storage component of the virtual infrastructure, the first template VM comprising a first OS virtual disk (VMDK);
    cloning, by the CMS, the first template VM to create a plurality of linked clone VMs, wherein each linked clone VM in the plurality of linked clone VMs runs on a host system in the virtual infrastructure, and wherein each linked clone VM has a first logical link to the first OS VMDK that enables the linked clone VM to execute a guest OS by accessing the first OS VMDK from the storage component;
    at a time an upgrade is available for the guest OS, creating, by the CMS, a second template VM that comprises a second OS VMDK, wherein the second OS VMDK includes an upgraded version of the guest OS; and
    for each linked clone VM in the plurality of linked clone VMs:
        detaching, by the CMS, the first OS VMDK from the linked clone VM by removing the first logical link between the linked clone VM and the first OS VMDK; and
        attaching, by the CMS, the second OS VMDK to the linked clone VM by creating a second logical link between the linked clone VM and the second OS VMDK, the second logical link enabling the linked clone VM to execute the updated version of the guest OS by accessing the second OS VMDK from the storage component,
    wherein each linked clone VM further has a third logical link to a data VMDK, the data VMDK being specific to the linked clone VM and used to store write data that is generated by the linked clone VM at runtime, and wherein the data VMDK remains attached to the linked clone VM after the first OS VMDK is detached and the second OS VMDK is attached.

2. The method of claim 1 further comprising, prior to detaching the first OS VMDK from the linked clone VM:
    transmitting, to the linked clone VM, a command to stop execution of the guest OS; and
    transmitting, to the linked clone VM, a command to perform one or more pre-upgrade actions.

3. The method of claim 2 wherein performing the one or more pre-upgrade actions comprises:
    retrieving configuration information that is specific to the linked clone VM from one or more delta disks associated with the first OS VMDK; and
    saving the configuration information in the data VMDK.

4. The method of claim 2 further comprising, after attaching the second OS VMDK to the linked clone VM:
    transmitting, to the linked clone VM, a command to perform one or more post-upgrade actions; and
    transmitting, to the linked clone VM, a command to restart execution of the guest OS.

5. The method of claim 4 wherein performing the one or more post-upgrade actions comprises:
    retrieving configuration information that is specific to the linked clone VM from the data VMDK; and
    saving the configuration information in one or more delta disks associated with the second OS VMDK.

6. The method of claim 1 wherein the second OS VMDK is attached to the linked clone VM before the first OS VMDK is detached from the linked clone VM.

7. A non-transitory computer readable storage medium having stored thereon computer software executable by a central management server (CMS) in a virtual infrastructure, the computer software embodying a method for performing a virtual machine (VM) operating system (OS) upgrade, the method comprising:
    creating a first template VM in a storage component of the virtual infrastructure, the first template VM comprising a first OS virtual disk (VMDK);
    cloning the first template VM to create a plurality of linked clone VMs, wherein each linked clone VM in the plurality of linked clone VMs runs on a host system in the virtual infrastructure, and wherein each linked clone VM has a first logical link to the first OS VMDK that enables the linked clone VM to execute a guest OS by accessing the first OS VMDK from the storage component;
    at a time an upgrade is available for the guest OS, creating a second template VM that comprises a second OS VMDK, wherein the second OS VMDK includes an upgraded version of the guest OS; and
    for each linked clone VM in the plurality of linked clone VMs:
        detaching the first OS VMDK from the linked clone VM by removing the first logical link between the linked clone VM and the first OS VMDK; and
        attaching the second OS VMDK to the linked clone VM by creating a second logical link between the linked clone VM and the second OS VMDK, the second logical link enabling the linked clone VM to execute the updated version of the guest OS by accessing the second OS VMDK from the storage component,
    wherein each linked clone VM further has a third logical link to a data VMDK, the data VMDK being specific to the linked clone VM and used to store write data that is generated by the linked clone VM at runtime, and wherein the data VMDK remains attached to the linked clone VM after the first OS VMDK is detached and the second OS VMDK is attached.

8. The non-transitory computer readable storage medium of claim 7 wherein the method further comprises, prior to detaching the first OS VMDK from the linked clone VM:
   transmitting, to the linked clone VM, a command to stop execution of the guest OS; and
   transmitting, to the linked clone VM, a command to perform one or more pre-upgrade actions.

9. The non-transitory computer readable storage medium of claim 8 wherein performing the one or more pre-upgrade actions comprises:
   retrieving configuration information that is specific to the linked clone VM from one or more delta disks associated with the first OS VMDK; and
   saving the configuration information in the data VMDK.

10. The non-transitory computer readable storage medium of claim 8 wherein the method further comprises, after attaching the second OS VMDK to the linked clone VM:
   transmitting, to the linked clone VM, a command to perform one or more post-upgrade actions; and
   transmitting, to the linked clone VM, a command to restart execution of the guest OS.

11. The non-transitory computer readable storage medium of claim 10 wherein performing the one or more post-upgrade actions comprises:
   retrieving configuration information that is specific to the linked clone VM from the data VMDK; and
   saving the configuration information in one or more delta disks associated with the second OS VMDK.

12. The non-transitory computer readable storage medium of claim 7 wherein the second OS VMDK is attached to the linked clone VM before the first OS VMDK is detached from the linked clone VM.

13. A central management server (CMS) in a virtual infrastructure configured to perform a virtual machine (VM) operating system (OS) upgrade, the CMS comprising:
   a hardware-based processor hosting the CMS and configured to:
      create a first template VM in a storage component of the virtual infrastructure, the first template VM comprising a first OS virtual disk (VMDK);
      clone the first template VM to create a plurality of linked clone VMs, wherein each linked clone VM in the plurality of linked clone VMs runs on a host system in the virtual infrastructure, and wherein each linked clone VM has a first logical link to the first OS VMDK that enables the linked clone VM to execute a guest OS by accessing the first OS VMDK from the storage component;
      at a time an upgrade is available for the guest OS, create a second template VM that comprises a second OS VMDK, wherein the second OS VMDK includes an upgraded version of the guest OS; and
      for each linked clone VM in the plurality of linked clone VMs:
         detach the first OS VMDK from the linked clone VM by removing the first logical link between the linked clone VM and the first OS VMDK; and
         attach the second OS VMDK to the linked clone VM by creating a second logical link between the linked clone VM and the second OS VMDK, the second logical link enabling the linked clone VM to execute the updated version of the guest OS by accessing the second OS VMDK from the storage component,
   wherein each linked clone VM further has a third logical link to a data VMDK, the data VMDK being specific to the linked clone VM and used to store write data that is generated by the linked clone VM at runtime, and wherein the data VMDK remains attached to the linked clone VM after the first OS VMDK is detached and the second OS VMDK is attached.

14. The CMS of claim 13 wherein the processor is further configured to, prior to detaching the first OS VMDK from the linked clone VM:
   transmit, to the linked clone VM, a command to stop execution of the guest OS; and
   transmit, to the linked clone VM, a command to perform one or more pre-upgrade actions.

15. The CMS of claim 14 wherein performing the one or more pre-upgrade actions comprises:
   retrieving configuration information that is specific to the linked clone VM from one or more delta disks associated with the first OS VMDK; and
   saving the configuration information in the data VMDK.

16. The CMS of claim 14 wherein the processor is further configured to, after attaching the second OS VMDK to the linked clone VM:
   transmit, to the linked clone VM, a command to perform one or more post-upgrade actions; and
   transmit, to the linked clone VM, a command to restart execution of the guest OS.

17. The CMS of claim 16 wherein performing the one or more post-upgrade actions comprises:
   retrieving configuration information that is specific to the linked clone VM from the data VMDK; and
   saving the configuration information in one or more delta disks associated with the second OS VMDK.

18. The CMS of claim 15 wherein the second OS VMDK is attached to the linked clone VM before the first OS VMDK is detached from the linked clone VM.

* * * * *